No. 860,741. PATENTED JULY 23, 1907.
H. F. FOWLES.
DETACHABLE HANDLE FOR CROCKERY.
APPLICATION FILED MAR. 1, 1905.

Witnesses
Geo. Ackman Jr.
F. A. Elmore

Inventor
Henry F. Fowles
By Victor J. Evans
Attorney

THE NORRIS PETERS CO., WASHINGTON, D. C.

UNITED STATES PATENT OFFICE.

HENRY FRANCIS FOWLES, OF REPUBLIC, WASHINGTON.

DETACHABLE HANDLE FOR CROCKERY.

No. 860,741.   Specification of Letters Patent.   Patented July 23, 1907.

Application filed March 1, 1905. Serial No. 247,903.

*To all whom it may concern:*

Be it known that I, HENRY FRANCIS FOWLES, a citizen of the United States, residing at Republic, in the county of Ferry and State of Washington, have invented new and useful Improvements in Detachable Handles for Crockery, of which the following is a specification.

This invention relates to detachable handles for vessels, designed especially for use in connection with cups and similar crockery, and has for its objects to provide a comparatively simple, inexpensive device of this character which in practice will be free from liability of breakage, and one which may be readily engaged with the vessel for use or detached during the operation of washing the vessel.

With these and other objects in view, the invention comprises the novel features of construction and combination of parts more fully hereinafter described.

Figure 1:
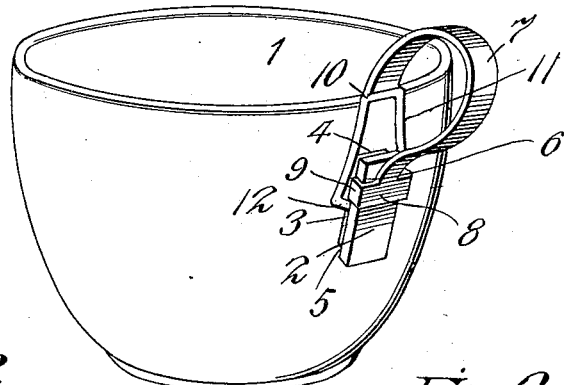
Figure 2:
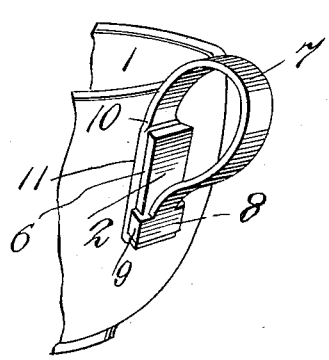
Figure 3:
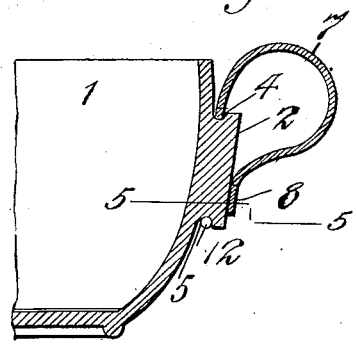
Figure 4:
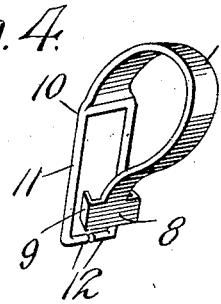
Figure 5:
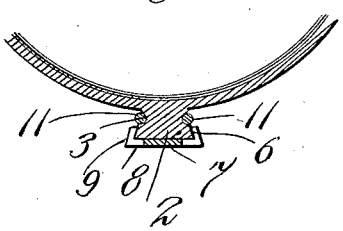

In the accompanying drawings: Figure 1 is a perspective view of a cup equipped with a handle embodying the invention and showing the handle partially detached. Fig. 2 is a detail, perspective view, showing the handle in applied position on the cup. Fig. 3 is a detail, sectional view taken centrally and longitudinally through the handle and the adjacent wall of the cup. Fig. 4 is a perspective view of the handle. Fig. 5 is a cross section taken on the line 5—5 of Fig. 3.

Referring to the drawings, 1 designates a cup or other vessel having formed on its side wall an integral handle receiving projection or lug 2 preferably of substantially rectangular form, as shown, and having formed in its side edges longitudinally extending grooves or channels 3 and in its upper and lower end edges respectively grooves or seats 4 5, there being produced at the sides of the lugs by the formation of the grooves 3 longitudinal flanges 6, which are transversely beveled or inclined as shown.

Employed in connection with the vessel 1 is a detachable handle 7 composed of a length of sheet metal bent into shape and terminating at its lower end in a cross piece or head 8 having terminal inturned flanges 9 disposed at an angle to conform to the transverse inclination of the flanges 6, while brazed onto or otherwise attached to the upper end of the handle is a substantially U-shaped engaging member or bail 10 composed of a length of spring wire or other appropriate material and presenting side portions or arms 11 terminating at their lower ends in inturned engaging fingers 12, the inner ends of which are spaced a suitable distance apart.

In practice, when the handle is in position on the cup, the side portions 11 of the engaging portion 10 seat in the longitudinal grooves 3, while the upper end of the member seats in the groove 4 and the fingers 12 engage in the end groove 5, thus securely attaching the upper end of the handle to the cup, the lower end of the handle being attached through engagement of the flanges 9 of the cross piece 8 with the side flanges 6. In order to remove the handle, the lower ends of the arms 11 are swung outward beyond the sides of the lug 2, whereupon the handle may be moved bodily upward, during which action the fingers will ride in the grooves 3 and the cross piece 8 slide freely upward on the lug, as illustrated in Fig. 1.

It is apparent that under the foregoing construction there is provided a simple, inexpensive means for detachably engaging the handle with the cup and which will hold the handle normally in fixed position to permit its ready detachment when desired or when circumstances require.

Having thus described my invention, what I claim is:

1. In a device of the class described, a vessel provided with a handle attaching lug having grooves formed in its side edges and lower end edge, a handle having at its lower end a cross piece provided with inturned flanges to engage the side edges of the lug, and an engaging member carried by the upper end of the handle and provided with side arms to seat in the longitudinal grooves, said arms being terminated at their lower ends in engaging fingers to seat in the end groove.

2. In a device of the class described, a vessel provided with a handle attaching lug having longitudinal grooves formed in its side edges, a handle provided at one end with an engaging member having side arms to seat in said grooves and terminated at their lower ends in inturned fingers to engage the lower end of the lug, and a cross piece attached to the lower end of the handle and having terminal engaging portions formed for engagement with said lug.

In testimony whereof I affix my signature.

HENRY FRANCIS FOWLES.

In presence of—
  CHARLES T. GOODSELL,
  ETHYL GOODSELL.